United States Patent
Lai (10) Patent No.: US 12,072,280 B2
(45) Date of Patent: Aug. 27, 2024

(54) GLUE OVERFLOW DETECTION SYSTEM AND METHOD

(71) Applicant: GUANGZHOU LUXVISIONS INNOVATION TECHNOLOGY LIMITED, Guangzhou (CN)

(72) Inventor: Chih-Hung Lai, Guangzhou (CN)

(73) Assignee: GUANGZHOU LUXVISIONS INNOVATION TECHNOLOGY LIMITED, Guangzhou (CN)

(*) Notice: Subject to any disclaimer, the term of this patent is extended or adjusted under 35 U.S.C. 154(b) by 57 days.

(21) Appl. No.: 17/984,498

(22) Filed: Nov. 10, 2022

(65) Prior Publication Data
US 2023/0071123 A1 Mar. 9, 2023

(30) Foreign Application Priority Data
Jul. 5, 2022 (CN) .......................... 202210785275.5

(51) Int. Cl.
*G01N 21/17* (2006.01)
*G01N 21/63* (2006.01)
(Continued)

(52) U.S. Cl.
CPC .............. *G01N 21/17* (2013.01); *G01N 21/63* (2013.01); *G01N 21/85* (2013.01); *G01F 23/802* (2022.01);
(Continued)

(58) Field of Classification Search
CPC ...... G01N 21/958; G01N 21/63; G01N 21/85; G01N 21/17; G01N 2021/8592;
(Continued)

(56) References Cited

U.S. PATENT DOCUMENTS

| | | | | |
|---|---|---|---|---|
| 2017/0176255 A1* | 6/2017 | Nciri | ..................... | G01J 3/0224 |
| 2017/0276544 A1* | 9/2017 | Gastaldo | .............. | G01B 11/022 |
| 2020/0340859 A1* | 10/2020 | Meng | .................... | G01J 3/1838 |

OTHER PUBLICATIONS

Yu "Detection Method Of Irregular Glue Overflow, Device, Device And Storage Medium", Sep. 10, 2021, CN 113379723 A (Year: 2021).*

(Continued)

*Primary Examiner* — Sang H Nguyen
(74) *Attorney, Agent, or Firm* — Birch, Stewart, Kolasch & Birch, LLP (57) ABSTRACT

A glue overflow detection system and method, includes a camera module and a processor. The camera module is configured to capture an image which includes a blue chromaticity image and a red chromaticity image. The processor obtains a chromatic-aberration difference image according to the blue chromaticity image and the red chromaticity image. The processor obtains a block feature image according to the chromatic-aberration difference image. The processor obtains a longitudinal inter-block difference image and a transverse inter-block difference image according to the block feature image. The longitudinal inter-block difference image includes a plurality of longitudinal block difference blocks each of which has a longitudinal difference value. The transverse inter-block difference image includes a plurality of transverse block difference blocks each of which has a transverse difference vale. The processor determines that a glue overflow image exists in the image according to the longitudinal difference values and the transverse difference values.

10 Claims, 5 Drawing Sheets

(51) Int. Cl.
*G01N 21/85* (2006.01)
*G01F 23/80* (2022.01)

(52) U.S. Cl.
CPC ............... *G01N 2021/1776* (2013.01); *G01N 2021/634* (2013.01); *G01N 2021/8592* (2013.01)

(58) Field of Classification Search
CPC ..... G01N 2021/1776; G01N 2021/634; G01N 2021/9583; G01F 23/802; G01F 23/292
See application file for complete search history.

(56) References Cited

OTHER PUBLICATIONS

Yang "A Lens Defect Detection System", Jun. 26, 2020, CN 111337518A (Year: 2020).*
Endo et al "Method of Screening Germ for Cell-Free Protein Synthesis and Method of Producing Germ Extract for Cell-Free Protein Synthesis", Nov. 28, 2002, WO02095377 A1 (Year: 2002).*
Zhang et al "System and Method for Obtaining Image of Granular Sticky Materials in Papermaking Pulp", Dec. 14, 2017, WO 2017210973 A1 (Year: 2017).*

* cited by examiner

GLUE OVERFLOW DETECTION SYSTEM AND METHOD

CROSS-REFERENCE TO RELATED APPLICATION

This non-provisional application claims priority under 35 U.S.C. § 119(a) to Patent Application No. 202210785275.5 filed in China on Jul. 5, 2022, the entire contents of which are hereby incorporated by reference.

BACKGROUND

Technical Field

The present invention relates to a detection system and a method therefor, and in particular, to a glue overflow detection system and a method therefor.

Related Art

During assembling of items, two parts are sometimes engaged and assembled by glue. During the engagement and assembling, it is inevitable that too much glue is to be injected, resulting in the situation that the glue overflows the surface of the object after the two parts are assembled, which not only easily causes poor product sales due to a bad appearance, but also sometimes even affects the function of the product. For example, if glue overflow occurs in the lens module during the assembly and dispensing, it will easily affect the photo quality. Therefore, it is necessary to find out the lens module with the glue overflow condition before the product is sold.

However, it is not easy to find the glue overflow position or determine whether the glue overflows. One of the main reasons is that most of the glue is transparent, which greatly increases the difficulty of determination. In addition, the glue overflow position, a color depth, a size and a shape of each item are not fixed, which further increases the difficulty of determination. Therefore, how to determine whether the glue overflows becomes quite important.

SUMMARY

In view of the problems in the prior art, the inventor provides a solution, which relates to a glue overflow detection system, including a camera module and a processor.

The camera module is configured to capture an image. The image includes a blue chromaticity image and a red chromaticity image. The blue chromaticity image includes a plurality of blue pixel values, and the red chromaticity image includes a plurality of red pixel values.

The processor has a chromatic-aberration difference program, a block feature program, an inter-block difference program, and a determination program. The processor executes the chromatic-aberration difference program to obtain a chromatic-aberration difference image according to the blue chromaticity image and the red chromaticity image. The chromatic-aberration difference image includes a plurality of chromatic-aberration difference pixel values. The processor executes the block feature program to obtain a block feature image according to the chromatic-aberration difference image. The block feature image includes a plurality of feature blocks. Each of the feature blocks corresponds to a plurality of adjacent chromatic-aberration difference pixel values and has a block feature value, and the block feature value of the each feature block is a representative value of the chromatic-aberration difference pixel values corresponding to the feature block. The processor executes the inter-block difference program to obtain a longitudinal inter-block difference image and a transverse inter-block difference image according to the block feature image. The longitudinal inter-block difference image includes a plurality of longitudinal block difference blocks. The transverse inter-block difference image includes a plurality of transverse block difference blocks. The longitudinal inter-block difference image is obtained by executing a longitudinal difference value program on the feature block of the block feature image, so that each of the longitudinal block difference blocks has a longitudinal difference value, and the transverse inter-block difference image is obtained by executing a transverse difference value program on the feature blocks of the block feature image, so that each of the transverse block difference blocks has a transverse difference value. The processor executes the determination program, and determines that a glue overflow image exists in the image when one of the longitudinal difference values and the transverse difference values is greater than a threshold.

In addition, the inventor also provides a glue overflow detection method, including:

obtaining a blue chromaticity image and a red chromaticity image according to an image, where the blue chromaticity image includes a plurality of blue pixel values and the red chromaticity image includes a plurality of red pixel values; obtaining a chromatic-aberration difference image according to the blue chromaticity image and the red chromaticity image, where the chromatic-aberration difference image includes a plurality of chromatic-aberration difference pixel values; obtaining a block feature image according to the chromatic-aberration difference image, where the block feature image includes a plurality of feature blocks, each of the feature blocks corresponds to a plurality of adjacent chromatic-aberration difference pixel values and has a block feature value, and the block feature value of the each feature block is a representative value of the chromatic-aberration difference pixel values corresponding to the feature block; obtaining a longitudinal inter-block difference image and a transverse inter-block difference image according to the block feature image, where the longitudinal inter-block difference image includes a plurality of longitudinal block difference blocks, the transverse inter-block difference image includes a plurality of transverse block difference blocks, the longitudinal inter-block difference image is obtained by executing a longitudinal difference value program on the feature blocks of the block feature image, so that each of the longitudinal block difference blocks has a longitudinal difference value, and the transverse inter-block difference image is obtained by executing a transverse difference value program on the feature blocks of the block feature image, so that each of the transverse block difference blocks has a transverse difference value; and determining that a glue overflow image exists in the image when one of the longitudinal difference values and the transverse difference values is greater than a threshold.

When the invention is used for glue overflow detection and the image has a glue overflow condition, the longitudinal difference value of some longitudinal block difference block in the longitudinal inter-block difference image is obviously greater than longitudinal difference values of other longitudinal block difference blocks, even exceeds the threshold, or the transverse difference value of some transverse block difference blocks in the transverse inter-block difference image are obviously greater than transverse difference values of other transverse block difference blocks, even exceeds the threshold, which means that glue overflow occurs in the block. Therefore, regardless of a position, a color, a size, and a shape of the glue overflow, the glue overflow detection system of the present invention can effectively detect the glue overflow condition.

DETAILED DESCRIPTION

Figure 1:
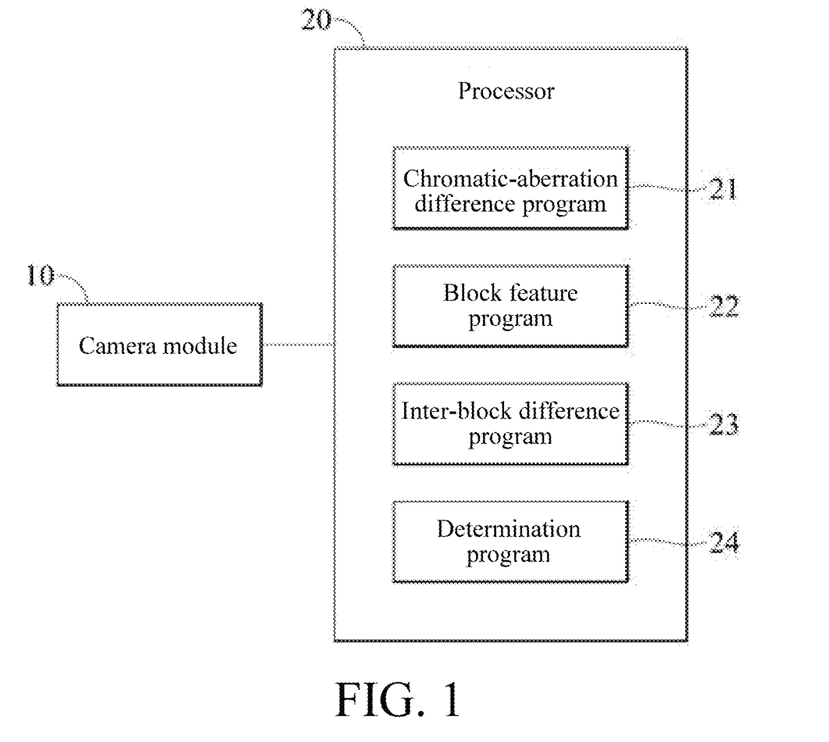
FIG. 1 is a schematic block diagram of connections among components according to an embodiment of the present invention.
Figure 2:
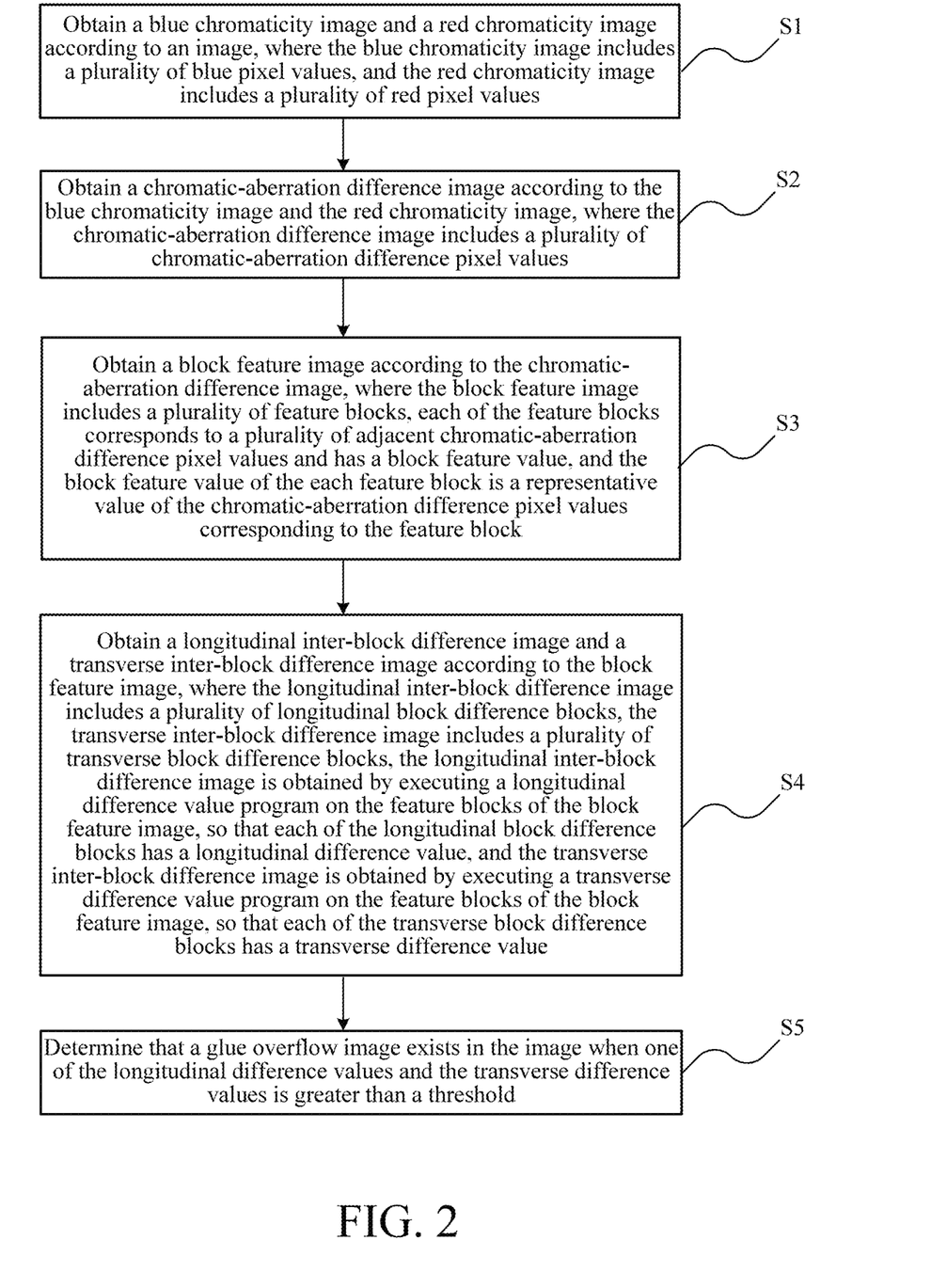
FIG. 2 is an operation flowchart according to an embodiment of the present invention.

Referring to FIG. 1 and FIG. 2, according to an embodiment, a glue overflow detection system includes a camera module 10 and a processor 20. The processor 20 has a chromatic-aberration difference program 21, a block feature program 22, an inter-block difference program 23, and a determination program 24. All embodiments of the present invention are respectively described below with reference to the following drawings.

Referring to FIG. 1, the camera module 10 is configured to capture an image. The image includes a blue chromaticity image and a red chromaticity image. The blue chromaticity image includes a plurality of blue pixel values, and the red chromaticity image includes a plurality of red pixel values. In some embodiments, the camera module 10 shoots glued items, for example, a camera lens module, and in the shooting process, the items are placed on a white board and a desktop for shooting, so that a glue overflow position can be highlighted in the image. In addition, in some embodiments, the images are the blue chromaticity image and the red chromaticity image obtained by color space conversion. The color space conversion may be YCbCr color space conversion or Y'cbCr color space conversion. Moreover, in some embodiments, the YCbCr color space conversion is performed on the image according to the following formula 1, formula 2, and formula 3, to obtain a lumen image, a blue chromaticity image, and a red chromaticity image. Y is the lumen image, Cb is the blue chromaticity image, Cr is the red chromaticity image, R is the red pixel value, G is a green pixel value, and B is a blue pixel value.

$$Y=0.257*R+0.564*G+0.098*B+16 \quad \text{Formula 1}$$

$$Cb=-0.148*R-0.291*G+0.439*B+128 \quad \text{Formula 2}$$

$$Cr=0.439*R-0.368*G-0.071*B+128 \quad \text{Formula 3}$$

Referring to FIG. 1 and FIG. 2, the processor 20 executes the chromatic-aberration difference program 21 to obtain a chromatic-aberration difference image according to the blue chromaticity image and the red chromaticity image. The chromatic-aberration difference image includes a plurality of chromatic-aberration difference pixel values. In some embodiments, the chromatic-aberration difference program 21 is configured to obtain a chromatic-aberration difference image by getting an absolute value of the blue chromaticity image subtracted from the red chromaticity image according to the following formula 4. In addition, either |Cr[x,y]−Cb[x,y]| or |Cb[x,y]−Cr[x,y]| is allowed in formula 4.

$$Cr\text{-}Cb[x, y] = |Cr[x, y]\text{-}Cb[x, y]|, \begin{cases} x, & 0 \le x < \text{image width} \\ y, & 0 \le y < \text{image height} \end{cases} \quad \text{Formula 4}$$

In addition, in some embodiments, in order to make the chromatic-aberration difference image have more obvious chromatic-aberration difference, a default value is added to each chromatic-aberration difference pixel value in the chromatic-aberration difference image. For example, the following formula 5 is calculated with the default value of 100.

$$Cr\text{-}Cb[x, y] = |Cr[x, y]\text{-}Cb[x, y]| + 100, \quad \text{Formula 5}$$
$$\begin{cases} x, & 0 \le x < \text{image width} \\ y, & 0 \le y < \text{image height} \end{cases}$$

Furthermore, in some embodiments, when the chromatic-aberration difference pixel value plus the default value is greater than or equal to a maximum value, the chromatic-aberration difference pixel value is the maximum value. For example, the maximum value is 255, and when Cr-Cb[1,1]=160 and Cr-Cb[1,1]+100=260>255, the value of Cr-Cb[1, 1] at this time is set to 255.

Figure 3:
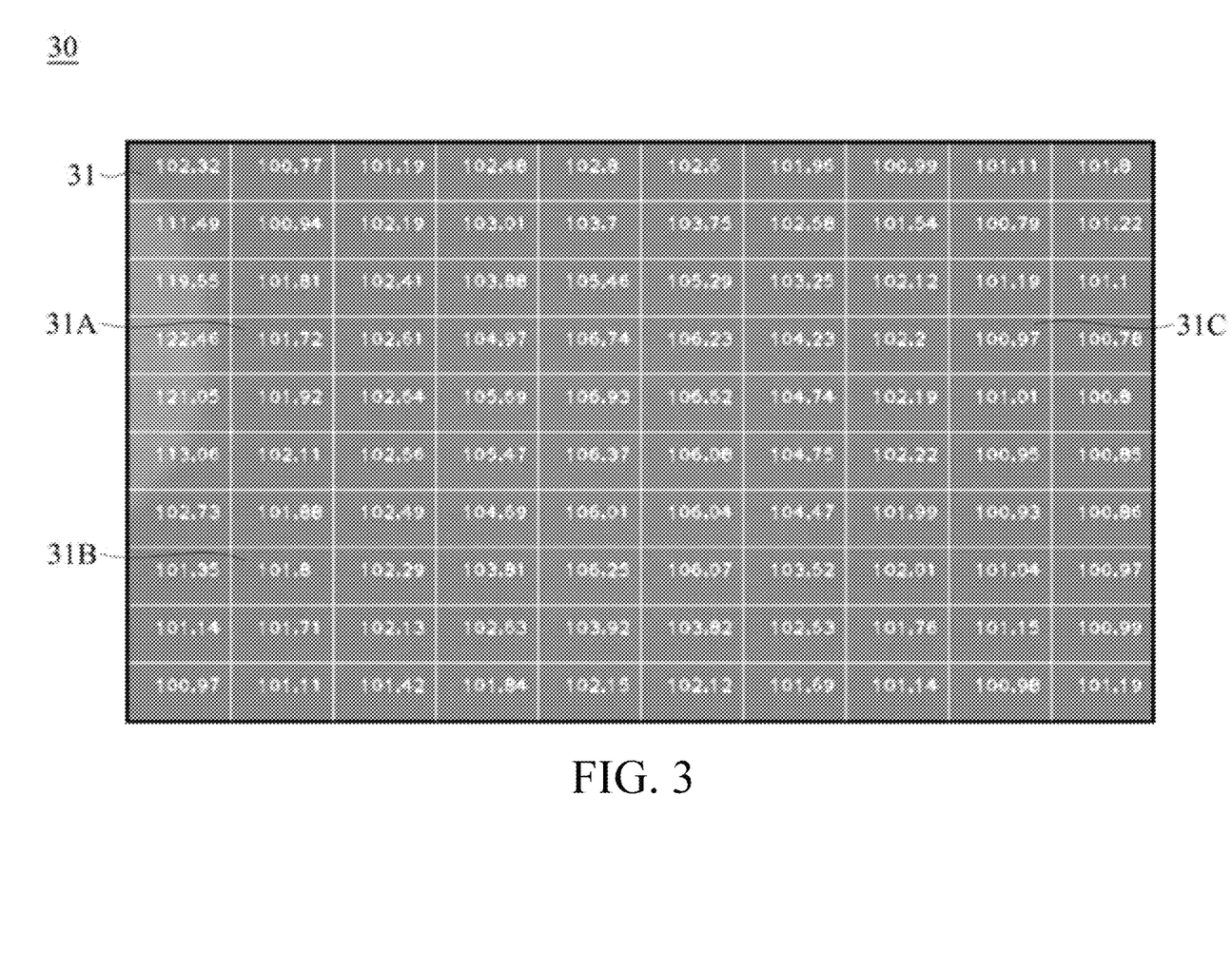
FIG. 3 is a schematic diagram of a block feature image according to an embodiment of the present invention.

Referring to FIG. 1, FIG. 2, and FIG. 3, the processor 20 executes the block feature program 22 to obtain a block feature image 30 according to the chromatic-aberration difference image. The block feature image 30 includes a plurality of feature blocks 31, each of the feature blocks 31 corresponds to a plurality of adjacent chromatic-aberration difference pixel values and has a block feature value, and the block feature value of the each feature block 31 is a representative value of the chromatic-aberration difference pixel values corresponding to the feature block 31. In some embodiments, the block feature program 22 first segments the chromatic-aberration difference image equally into a plurality of feature blocks 31, and therefore the block feature image 30 may be represented by the following formula 6. As shown in FIG. 3, when the block feature image 30 has feature blocks 31 longitudinally arranged in 10 columns and feature blocks 31 transversely arranged in 10 rows, x and y are respectively 10. In addition, Block[1,1] represents the feature block 31 located in the first row and the first column, and so on, and the details are not described herein again.

$$\text{Block}[x, y], \begin{cases} x, & 0 \le x < n \\ y, & 0 \le y < n \end{cases} \quad \text{Formula 6}$$

In some embodiments, the block feature value is an average chromatic-aberration value of the corresponding chromatic-aberration difference pixel values in the feature block 31, and the calculation method of the average chromatic-aberration value is shown in the following formula 7, where j is equal to a number of pixels in the each feature block 31, Ii is the chromatic-aberration difference pixel value of each pixel, and the value of Block[x,y] represents the average chromatic-aberration value. In some embodiments, numbers presented in FIG. 3 are the average chromatic-aberration value.

$$\text{Block}[x, y] = \frac{\sum_{i=1}^{i=j} I_i}{j} \quad \text{Formula 7}$$

Figure 4:
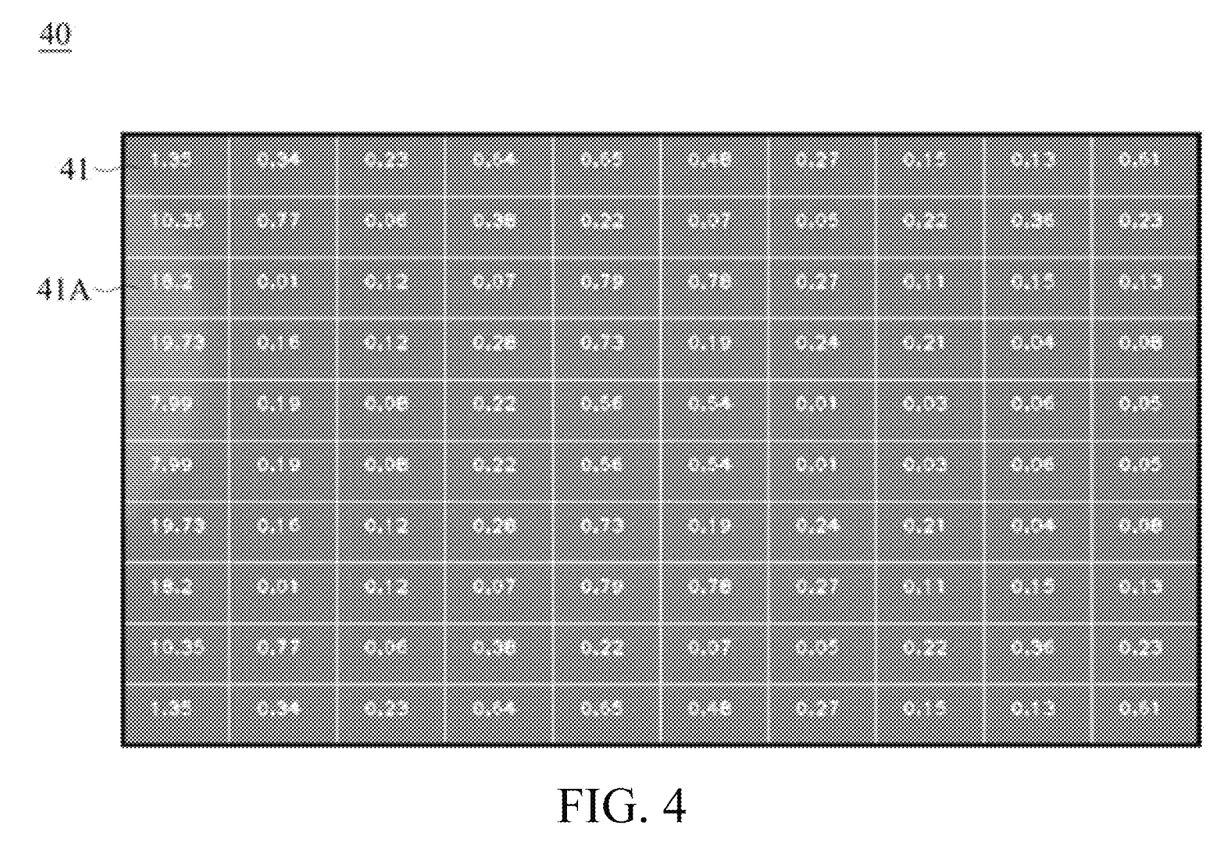
FIG. 4 is a schematic diagram of a longitudinal inter-block difference image according to an embodiment of the present invention.
Figure 5:
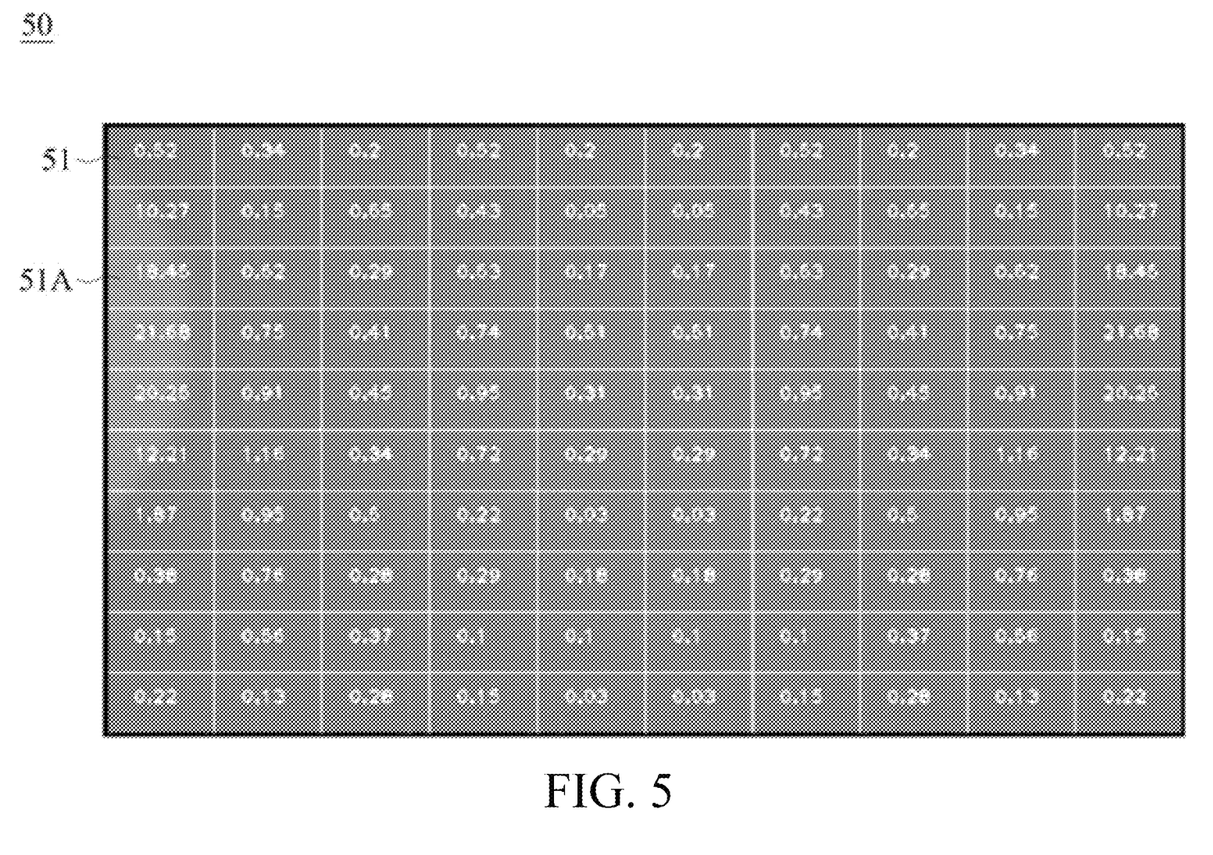
FIG. 5 is a schematic diagram of a transverse inter-block difference image according to an embodiment of the present invention.

Referring to FIG. 1, FIG. 2, and FIG. 3, the processor 20 executes the inter-block difference program 23 to obtain a longitudinal inter-block difference image 40 as shown in FIG. 4 and a transverse inter-block difference image 50 as shown in FIG. 5 according to the block feature image 30. The longitudinal inter-block difference image 40 includes a plurality of longitudinal block difference blocks 41, and the transverse inter-block difference image 50 includes a plurality of transverse block difference blocks 51. The longitudinal inter-block difference image 40 is obtained by executing a longitudinal difference value program on the feature block 31 of the block feature image 30, so that each of the longitudinal block difference blocks 41 has a longitudinal difference value. In some embodiments, numbers presented in the longitudinal block difference block 41 in FIG. 4 represent longitudinal difference values. The transverse inter-block difference image 50 is obtained by executing a transverse difference value program on the feature block 31 of the block feature image 30, so that each of the transverse block difference blocks 51 has a transverse difference value. In some embodiments, numbers presented in the transverse block difference block 51 in FIG. 5 represent transverse difference values. In some embodiments, referring to FIG. 3, the longitudinal difference value program is configured to compare the feature block 31A with other feature blocks 31B in a same column, and the transverse difference value program is configured to compare the feature block 31A with other feature blocks 31C in a same row.

Referring to FIG. 1 and FIG. 2, the processor 20 executes the determination program 24, and when one of the longitudinal difference value and the transverse difference value is greater than a threshold, it is determined that a glue overflow image exists in the image. For example, when the longitudinal difference value of the longitudinal block difference block 41A in FIG. 4 is greater than the threshold, it means that the glue overflow occurs at the position corresponding to the longitudinal block difference block 41A in the image.

Referring to FIG. 4 and FIG. 5, it is found that the longitudinal block difference block 41A, the transverse block difference block 51A and their surrounding blocks have significantly larger values than other blocks, indicating that glue overflow occurs in these blocks. It can be seen from this that through the glue overflow detection system of the present invention, it may be effectively detected whether the glue overflow occurs in the image. In addition, a large number of feature blocks 31 segmented by the block feature image 30 leads to more accurate detection of the position at which glue overflow occurs. Therefore, the glue overflow detection system of the present invention can effectively detect the glue overflow condition regardless of the position, the color, the size, and the shape of glue overflow.

In addition, in some embodiments, the longitudinal difference value program is configured to perform symmetrical comparison according to the following formula 8, that is, compare each of the feature blocks 31 in the block feature image 30 with the upper and lower feature blocks 31 that are symmetrical in position to obtain the longitudinal inter-block difference image 40.

$$\text{Bottom}[x, y] = |\text{Block}[x, y]\text{-Block}[x, m\text{-}y\text{-}1]| \begin{cases} x, & 0 \le x < n \\ y, & 0 \le y < m \end{cases} \quad \text{Formula 8}$$

The transverse difference value program is configured to perform symmetrical comparison according to the following formula 9, that is, compare the each feature block 31 in the block feature image 30 with the left and right feature blocks 31 that are symmetrical in position to obtain the transverse inter-block difference image 50.

$$\text{Bottom}[x, y] = |\text{Block}[x, y]\text{-Block}[n\text{-}x\text{-}1, y]| \begin{cases} x, & 0 \le x < n \\ y, & 0 \le y < m \end{cases} \quad \text{Formula 9}$$

In addition, in some embodiments, the longitudinal difference value program is configured to perform jump-type comparison according to the following formula 10, that is, compare the each feature block 31 in the block feature image 30 with the feature blocks 31 at an interval of z to obtain the longitudinal inter-block difference image 40. When y+z=m, the longitudinal difference value program is configured to perform jump-type comparison according to the following formula 11.

$$\text{Bottom}[x, y] = |\text{Block}[x, y]\text{-Block}[x, y+z]|, \begin{cases} x, & 0 \le x < n \\ y, & 0 \le y < m\text{-}z \end{cases} \quad \text{Formula 10}$$

$$\text{Bottom}[x, y] = |\text{Block}[x, y]\text{-Block}[x, (y+z)\text{-}m]|, \quad \text{Formula 11}$$
$$\begin{cases} x, & 0 \le x < n \\ y, & m\text{-}z \le y < m \end{cases}$$

Similarly, in some embodiments, the transverse difference value program is configured to perform jump-type comparison according to the following formula 12, and compares each feature block 31 in the block feature image 30 with the feature blocks 31 at an interval of z to obtain the longitudinal inter-block difference image 40. When x+z=n, the longitudinal difference value program is configured to perform jump-type comparison according to the following formula 13.

$$\text{Bottom}[x, y] = |\text{Block}[x, y]\text{-Block}[x+z, y]|, \begin{cases} x, & 0 \le x < n\text{-}z \\ y, & 0 \le y < m \end{cases} \quad \text{Formula 12}$$

$$\text{Bottom}[x, y] = |\text{Block}[x, y]\text{-Block}[(x+z)\text{-}n, y]|, \quad \text{Formula 13}$$
$$\begin{cases} x, & n\text{-}z \le x < n \\ y, & 0 \le y < m \end{cases}$$

As shown in FIG. 2 below, the glue overflow detection method of the present invention is provided, including the following steps.

Step S1: Obtain a blue chromaticity image and a red chromaticity image according to an image, where the blue chromaticity image includes a plurality of blue pixel values, and the red chromaticity image includes a plurality of red pixel values.

Step S2: Obtain a chromatic-aberration difference image according to the blue chromaticity image and the red chromaticity image, where the chromatic-aberration difference image includes a plurality of chromatic-aberration difference pixel values.

Step S3: Obtain a block feature image 30 according to the chromatic-aberration difference image, where the block feature image 30 includes a plurality of feature blocks 31, each of the feature blocks 31 corresponds to a plurality of adjacent chromatic-aberration difference pixel values and has a block feature value, and the block feature value of the each feature block 31 is a representative value of the chromatic-aberration difference pixel values corresponding to the feature block 31.

Step S4: Obtain a longitudinal inter-block difference image 40 and a transverse inter-block difference image 50 according to the block feature image 30, where the longitudinal inter-block difference image 40 includes a plurality of longitudinal block difference blocks 41, the transverse inter-block difference image 50 includes a plurality of transverse block difference blocks 51, the longitudinal inter-block difference image 40 is obtained by executing a longitudinal difference value program on the feature block 31 of the block feature image 30, so that each of the longitudinal block difference blocks 41 has a longitudinal difference value, and the transverse inter-block difference image 50 is obtained by executing a transverse difference value program on the feature blocks 31 of the block feature image 30, so that each of the transverse block difference blocks 51 has a transverse difference value.

Step S5: Determine that a glue overflow image exists in the image when one of the longitudinal difference values and the transverse difference values is greater than a threshold.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A glue overflow detection system, comprising:
    a camera module, configured to capture an image, wherein the image comprises a blue chromaticity image and a red chromaticity image, the blue chromaticity image comprises a plurality of blue pixel values, and the red chromaticity image comprises a plurality of red pixel values; and
    a processor, having a chromatic-aberration difference program, a block feature program, an inter-block difference program, and a determination program, wherein
    the processor executes the chromatic-aberration difference program to obtain a chromatic-aberration difference image according to the blue chromaticity image and the red chromaticity image, and the chromatic-aberration difference image comprises a plurality of chromatic-aberration difference pixel values;
    the processor executes the block feature program to obtain a block feature image according to the chromatic-aberration difference image, wherein the block feature image comprises a plurality of feature blocks, each of the feature blocks corresponds to a plurality of adjacent chromatic-aberration difference pixel values and has a block feature value, and the block feature value of the each feature block is a representative value of the chromatic-aberration difference pixel values corresponding to the feature block;
    the processor executes the inter-block difference program to obtain a longitudinal inter-block difference image and a transverse inter-block difference image according to the block feature image, wherein the longitudinal inter-block difference image comprises a plurality of longitudinal block difference blocks, the transverse inter-block difference image comprises a plurality of transverse block difference blocks, the longitudinal inter-block difference image is obtained by executing a longitudinal difference value program on the feature block of the block feature image, so that each of the longitudinal block difference blocks has a longitudinal difference value, and the transverse inter-block difference image is obtained by performing a transverse difference value program on the feature block of the block feature image, so that each of the transverse block difference blocks has a transverse difference value; and
    the processor executes the determination program, and determines whether a glue overflow image exists in the image according to the plurality of longitudinal difference values, the plurality of transverse difference values, and a threshold.

2. The glue overflow detection system according to claim 1, wherein during the execution of the chromatic-aberration difference program, the processor adds a default value to each of the chromatic-aberration difference pixel values in the chromatic-aberration difference image, and when the chromatic-aberration difference pixel value plus the default value is greater than or equal to a maximum value, the chromatic-aberration difference pixel value is the maximum value.

3. The glue overflow detection system according to claim 2, wherein during the execution of the block feature program by the processor, the block feature value of the each feature block is an average chromatic-aberration value of the chromatic-aberration difference pixel values corresponding to the feature block.

4. The glue overflow detection system according to claim 3, wherein the longitudinal difference value program executed by the processor is configured to compare the each feature block in the block feature image with the upper and lower feature blocks that are symmetrical in position, and the transverse difference value program executed by the processor is configured to compare the each feature block in the block feature image with the left and right feature blocks that are symmetrical in position.

5. The glue overflow detection system according to claim 1, wherein during the execution of the determination program, the processor obtains a longitudinal block difference block with the maximum longitudinal difference value from the plurality of longitudinal block difference blocks and obtains a transverse block difference block with the maximum transverse difference value from the transverse block difference blocks, wherein when the maximum difference exceeds the threshold, it is determined that the glue overflow image exists in the image.

6. A glue overflow detection method, comprising:
    obtaining a blue chromaticity image and a red chromaticity image according to an image, wherein the blue chromaticity image comprises a plurality of blue pixel values, and the red chromaticity image comprises a plurality of red pixel values;
    obtaining a chromatic-aberration difference image according to the blue chromaticity image and the red chromaticity image, wherein the chromatic-aberration difference image comprises a plurality of chromatic-aberration difference pixel values;
    obtaining a block feature image according to the chromatic-aberration difference image, wherein the block feature image comprises a plurality of feature blocks, each of the feature blocks corresponds to a plurality of adjacent chromatic-aberration difference pixel values and has a block feature value, and the block feature value of the each feature block is a representative value of the chromatic-aberration difference pixel value corresponding to the feature blocks;

obtaining a longitudinal inter-block difference image and a transverse inter-block difference image according to the block feature image, wherein the longitudinal inter-block difference image comprises a plurality of longitudinal block difference blocks, the transverse inter-block difference image comprises a plurality of transverse block difference blocks, the longitudinal inter-block difference image is obtained by executing a longitudinal difference value program on the feature block of the block feature image, so that each of the longitudinal block difference blocks has a longitudinal difference value, and the transverse inter-block difference image is obtained by executing a transverse difference value program on the feature block of the block feature image, so that each of the transverse block difference blocks has a transverse difference value; and determining whether a glue overflow image exists in the image according to the plurality of longitudinal difference values, the plurality of transverse difference values, and a threshold.

7. The glue overflow detection method according to claim 6, wherein a default value is added to each of the chromatic-aberration difference pixel values in the chromatic-aberration difference image, and when the chromatic-aberration difference pixel value plus the default value is greater than or equal to a maximum value, the chromatic-aberration difference pixel value is the maximum value.

8. The glue overflow detection method according to claim 7, wherein the block feature value of the each feature block is an average chromatic-aberration value of the chromatic-aberration difference pixel values corresponding to the feature block.

9. The glue overflow detection method according to claim 8, wherein the longitudinal difference value program is configured to compare the each feature block in the block feature image with the upper and lower feature blocks that are symmetrical in position, and the transverse difference value program is configured to compare the each feature block in the block feature image with the left and right feature blocks that are symmetrical in position.

10. The glue overflow detection method according to claim 6, wherein in the step of determining whether a glue overflow image exists in the image according to the plurality of longitudinal differences, the plurality of transverse differences, and the threshold, a longitudinal block difference block with the maximum longitudinal difference value is obtained from the plurality of longitudinal block difference blocks, and a transverse block difference block with the maximum transverse difference value is obtained from the transverse block difference blocks, wherein when the maximum difference exceeds the threshold, it is determined that the glue overflow image exists in the image.

* * * * *